Oct. 23, 1951          G. H. DIEKE          2,572,119
ELECTRICAL SYSTEM USING PHOTOMULTIPLIER
TUBE FOR SPECTROGRAPHIC ANALYSIS Filed April 16, 1946          5 Sheets-Sheet 1

INVENTOR
GERHARD H. DIEKE
BY
Woodcock and Phelan
ATTORNEYS

INVENTOR
GERHARD H. DIEKE
BY
Woodcock and Phelan
ATTORNEYS

Patented Oct. 23, 1951

2,572,119

UNITED STATES PATENT OFFICE 2,572,119

ELECTRICAL SYSTEM USING PHOTOMULTI-
PLIER TUBES FOR SPECTROGRAPHIC
ANALYSIS

Gerhard H. Dieke, Baltimore, Md.

Application April 16, 1946, Serial No. 662,531

15 Claims. (Cl. 88—14)

This invention relates to spectrographic analysis and particularly to systems suited under conditions of industrial routine for rapid and accurate quantitative spectrochemical analysis.

The present, commonly employed methods involve the use of a photographic plate which is exposed to the spectrum produced by an arc or spark discharge between electrodes of metal whose composition is to be determined. In practice, erratic results occur even with careful, experienced operators; with less experienced or less careful personnel considerable errors usually due to inadequacies of the photographic plate or its processing are frequent. Although calibration of a plate is simple enough in principle, it must be done with extreme care and is replete with difficulties even for experienced spectroscopists. As a matter of industrial expediency, usually the calibration of only one or a few of many plates used in the course of a day's analysis is checked. Even assuming individual calibration of the plates, errors arise because of non-uniformity existent in even a single plate; there is no certainty that a calibration based on the characteristic of one area or spot on a plate applies to all areas thereof. In fact, plates or films have not as yet been manufactured with such degree of uniformity that reliance can be placed on a spot calibration. Many other factors also effect accuracy of the results obtainable with the photographic method; for example, changes in humidity of the ambient air in which the plate is exposed, the temperature, concentration and age of the developing solution and the action of the fixing bath, all affect accuracy of the analysis.

The photographic method has the further disadvantage, significant in supervision of industrial processes, that a relatively long time is required properly to process the exposed plates. The time elapsing between insertion of a sample in the light source and availability of the analysis of its composition is for the most part spent in the development, washing, and drying of the photographic plate. With each step carefully performed, about one-half hour per analysis is required. This time may be somewhat shortened for many industrial purposes where permanence of the negative is not required but it cannot be reduced to say five minutes or less without prohibitive impairment of accuracy. Because of the inherent slowness of the photographic method, it has not, for example, been feasible to use spectrographic analysis for close control of the composition of a melt or in other industrial processes where time is of essence, either because of production demands or because the composition changes substantially between the time of withdrawal of a sample for analysis and the time when the results of that analysis become available.

In accordance with one aspect of this invention, direct, rapid and accurate measurement of the intensity of spectrum lines is effected by use of one or more photomultiplier tubes connected to a recorder or other measuring means as each scans the corresponding portion or portions of the spectrum to be analyzed. When the intensities of two or more lines are of interest, a corresponding number of tubes may be used, each with its own slit fixed at or movable past the point in the focal curve corresponding with desired spectrum line; preferably, each of the desired lines is scanned by a relatively movable unit comprising a photomultiplier tube and slit, thus to attain accuracy despite changes in geometry of the system due, for example, to temperature variations, misalignments of the slits and lines, otherwise undetectable variations in the light source, and other common sources of error. By proper choice of the time constant of the measuring device or its input circuit, integration of the intensity for an interval of say a second or so is obtainable to minimize errors due to transient effects.

In accordance with another but related aspect of the invention, the otherwise adverse effect of fluctuations of the spectrographic light source is compensated by measurement of the ratio of the output currents of two phototubes which simultaneously view or scan two spectrum lines. More specifically, and in a preferred arrangement, one tube is fixed to view a selected reference line of the spectrum during scanning of a desired part of the spectrum by another tube. With tubes of the same relative sensitivity, or the relative sensitivities being known, this is tantamount to a direct measurement of the intensity ratio of the lines themselves and has the advantage that it eliminates the undesirable influence of all fluctuations which similarly affect the lines. It is not necessary to know the relative sensitivity of the tubes, as the arrangement may be calibrated from a sample of known composition. More particularly, the tubes are included in a bridge circuit provided with networks which compensate for difference between the "dark" currents of the tubes.

The invention further resides in methods and systems having the features hereinafter described and claimed.

For a more detailed understanding of the invention, reference is made to the accompanying drawings, in which:

Fig. 6 is a circuit diagram of a voltage-stabilized power supply for the photomultiplier tubes of the spectograph;

Figure 1:
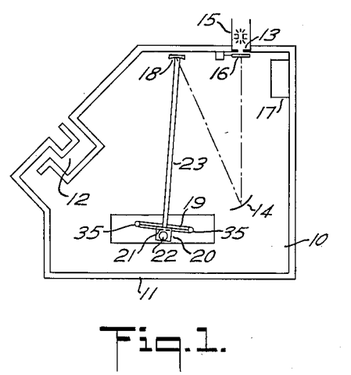
Fig. 1 diagrammatically illustrates the principal components of a grating spectrograph.

Referring to Fig. 1 as illustrative of an installation utilizing the invention, the whole spectrograph, preferably having the grating type of diffraction means because of the higher available resolution and the greater mechanical simplicity of the phototube mount arrangement, is within a room or enclosure 10 defined by the cinderblock partition or wall 11 and which may be entered through the maze 12 without admission of extraneous light. The entrance slit 13 of the spectrograph is disposed in an opening in the wall and is interposed between the collimating mirror 14 within room 10 and the light source 15 which may be accessible exteriorly of room 10 for insertion of samples to be analyzed. The shutter 16 for controlling passage of radiation from the entrance slit 13 to mirror 14 is preferably opened by momentary actuation of a solenoid and held open by a latch which is released by momentary energization of a second solenoid for return of the shutter to closed position by a spring. The solenoids may be controlled either manually by push buttons or switches on the control board 17, or automatically by timer switches 75, 76 (Figs. 4 and 12) of a control system later herein described.

The radiation is directed by the collimating mirror 14 to the grating 18 which may be mounted on one end of a pivoted beam 23 upon whose other end is mounted the holder or track member 19 which supports one or more units 20, each comprising an exit slit 21 and a photomultiplier cell 22. The member 19 which in location and general purpose corresponds with the conventional plate holder of a photographic type of spectograph may be provided with a focusing adjustment (not shown), preferably motor driven, for moving it along the beam 23 toward or away from the grating 18 or other equivalent spectrum-producing element. (Various elements appearing in Fig. 1 are shown for clarity on widely different scales.) Such focusing adjustment is effected after that portion of the spectrum which is of interest has been brought within the range of the holder 19 by swinging the beam 23 to the proper angle.

Figure 2:
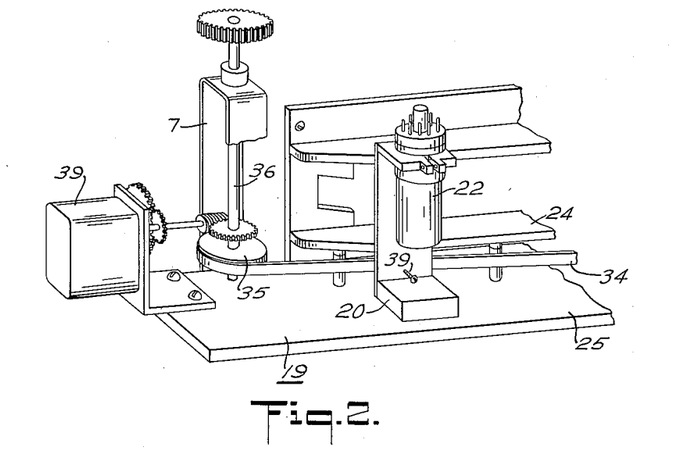
Fig. 2, in a perspective, illustrates in part a scanning arrangement used in the spectrograph of Fig. 1.

Photoelectrically to measure the intensity of a single spectrum line, the line must be isolated. This is done by disposition of the exit slit 21 exactly on the focal curve of the spectrum and at the location of that line. The tube 22 is mounted behind this slit to produce a current whose magnitude is a function of the intensity of the line. As shown in Fig. 2, the focal curve of holder 19 is formed by the curved metal plate or strip 24 secured to and extending horizontally from the rear face of holder 19. Each unit 20 is so constructed, Figs. 2, 3 and 12, that when it is against the plate 24 at any portion along the length thereof, the exit slit 21 of the unit is exactly on the focal curve of the spectrum. By placing a unit 20 at proper position against the plate 24, there is produced by the tube a current which can be measured in terms of the intensity of radiation at a particular wavelength in the spectrum. In measurement of the relative intensity of a selected pair of lines, one unit is thus positioned for exposure to a narrow wavelength band including one selected line and another unit is motor-driven along the focal curve plate 24, as later described, to scan a portion of the spectrum including the other selected line of the pair.

Figure 3:
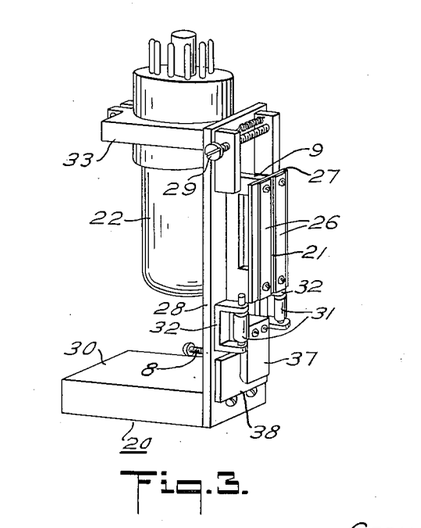
Fig. 3, in perspective and on enlarged scale, shows the slit and tube unit of Fig. 2.

More particularly, and as shown in Fig. 3, the exit slit 21 of unit 20 is defined by two spaced strips 26 suitably fastened to an aperture strip 27 secured to a block 9 pivotally mounted upon the vertical front plate 28 of the unit. By adjustment of screw 29, the slit may be rotated to bring it exactly parallel to the spectrum lines.

The intensity of a line insofar as effect upon a photographic plate is concerned, cannot be increased by increasing the width of the exit slit beyond a certain critical value which in practically all cases is narrower than the width usually used in routine work: the only effect of using a wider slit is to increase the width of the photographic image of the line with no increase of its intensity. The situation is very different with the photomultiplier tube: widening the slit allows more light to pass and to impinge upon a larger area of the photocathode with a correspondingly enhanced magnitude of photocurrent. Advantage may be taken of this characteristic by widening the slit when the intensity of weak lines is to be measured: unless the lines of a particular spectrum are too close together the width of the slit may be considerably wider than 0.3 mm. commonly used in photographic analysis.

The base 30 of the unit is heavy to bring the center of gravity of the unit as low as possible and is provided on the underside with three ball bearings, not shown, that it may slide freely along the base 25 of the holder 19. The roller bearings 31 for engaging the focal curve plate 24 are suitably mounted, as in brackets 32, upon the front plate 28 of the unit.

The phototube 22 is held in position behind the exit slit 21 by the split ring member 33 secured to the upper end of vertical plate 28 and extending rearwardly therefrom.

To effect movement of one or more units 20 along the focal curve, there is provided a thin stainless steel band 34 which passes over a pair of pulleys 35 respectively mounted at opposite ends of the holder 19 upon vertical shafts 36 supported by frames 7. A spring, not shown, maintains the band 34 under tension and firmly presses the unit or units 20 against the focal curve member 24 and so insures that the slit or slits are in the proper plane. The band 34 is releasably held to each scanning unit 20 by the fixed and movable clamping members 37 and 38. The unit may be released for setting to a different position merely by loosening screw 8 and lifting the unit to clear the band 34.

As usually the relative intensity of two or more lines is of interest, they may be isolated either successively by a single movable slit and tube unit 20 or simultaneously by a corresponding number of fixed units 20 with sequential connection of their tubes to the measuring apparatus. With either arrangement, an analysis can be made in a small fraction of the time required for photographic analysis and for intensity ratios which are far beyond the ability of a photographic plate to discern. Preferably, and for direct measurement or recording of relative intensity, one unit 20 is kept stationary on a reference line and the other line or lines are scanned by a unit or units moved with respect thereto, as by the motor-driven band or belt 34.

The all-fixed unit arrangement is relatively simple and if the equipment is designed for one specific purpose the units above described or simpler ones may be permanently mounted. The initial effort required to attain an accurate adjustment is relatively unimportant because made only once. This arrangement, however, is not suited without complications introduced by use of mirrors or prisms for measurements involving spectrum lines whose spacing is less than the width of the unit and even with such additional components is not suited when the lines are very close as, for example, within a millimeter or less. Another disadvantage of the fixed unit arrangement is that after the units have been permanently set, the spectrograph may get out of adjustment and the desired lines move partly or completely off the exit slits. A temperature change of only a few degrees may be sufficient to so upset the geometry of the spectrograph that such misalignment occurs. This disadvantage is troublesome when very narrow slits must be used to attain the resolution necessary to isolate closely spaced lines of a spectrum.

To avoid the need to make the time-consuming adjustments required when fixed slits must be reset for analysis of different spectra or to correct for uncontrolled misadjustments of the spectrograph, it is preferred to use one or more movable units 20, each of which scans a portion of the spectrum which includes one or more lines of interest. By a timed selector switch, later described, the photocell of each scanning unit is sequentially connected in the measuring circuit as that unit enters a narrow portion of the spectrum including a line of interest and is disconnected therefrom as it leaves that portion of the spectrum. With the construction of unit 20 and holder 19 above described, such scanning is effected by moving the band 34 at suitable speed and in such direction as to cause each unit clamped thereto to move along the focal curve member 24 between limits certain to include at least the spectrum line or lines necessary to the analysis. As shown in Fig. 2, this movement of the band is desirably effected automatically by motor 39 coupled to one of pulleys 35 by a suitable speed-reduction train providing for selection of different speed ratios. For example, the band 34 may be made to travel at any one of the rates of 20, 8, 4, 2, .08 millimeters per minute corresponding, in a particular spectrograph, to a motion of approximately 100, 40, 20, 10 and 4 angstrom units per minute in the first order, or half that rate in the second order.

Figure 4:
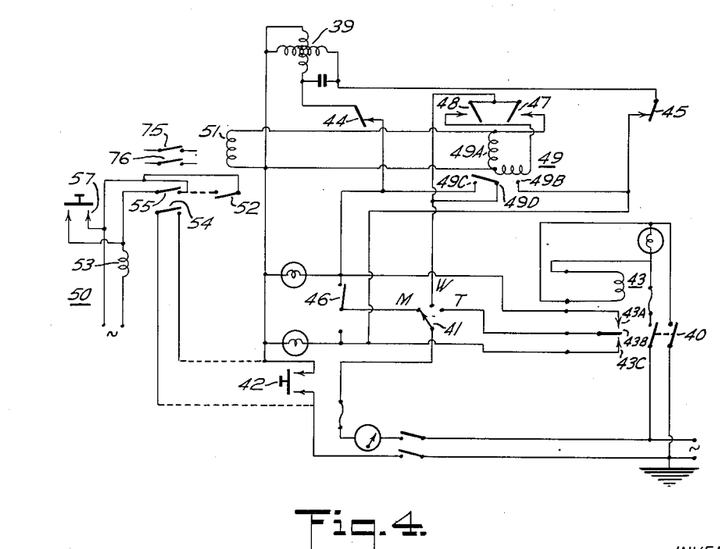
Fig. 4 schematically illustrates the scanning motor of Fig. 2 and its associated control circuits.
Figure 12:
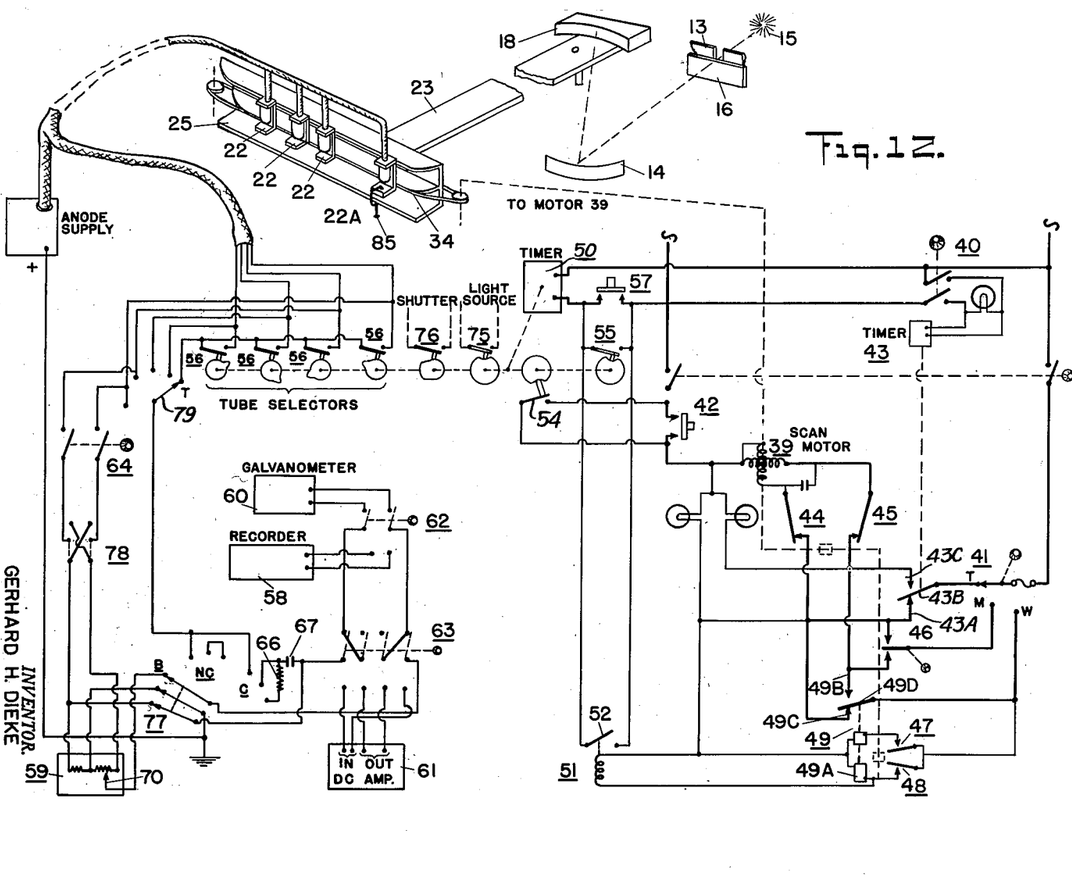
Fig. 12 is a composite of parts, circuits and circuit components appearing in Figs. 1 to 5 inclusive.

A system which allows selection of any one of several scanning controls for motor 39 is shown in Figs. 4 and 12.

With switch 40 closed, control switches 41 and 79 closed in position T, and the push button 42 locked in closed position, the timer 43 through its contacts 43A, 43B and 43C automatically reverses the connections of the scanning motor 39 at fixed intervals of time causing a line or group of lines to be repeatedly scanned by the tube or tubes leaving the operator free to devote his attention to other duties such as insertion and removal of samples at the light source. The circuit of motor 39 includes the limit switches 44, 45 which, for this position of control switch 41, de-energize the motor when a unit 20 reaches a predetermined position in either direction of movement. They may be used merely as safety switches or in conjunction with the timer 43 to afford a time interval between successive scanning movements in which a new sample may be inserted.

With switch 40 open, control switch 41 in M position, and push button 42 latched closed, the operator may manually control the forward and reverse scanning operations by actuation of the reversing switch 46 in circuit with the driving motor 39 for tape 34. With this type of control, the motor-actuated limit switches 44 and 45 serve as safety switches.

A third mode of control is attained with switch 40 open and the control switch 41 in its W position. With this control, assuming push button 42 is latched closed, the motor 39 is reversed, under control of limit switches 47, 48 and the reversing relay 49, when a scanning unit 20 reaches a position corresponding with a predetermined wavelength. The contacts 49B, 49C and 49D of the relay, as may be traced from Figs. 4 and 12, constitute a switch for reversing motor 39. Thus, that portion of the spectrum between wavelengths corresponding with the selected positions of the motor-actuated limit switches 47, 48 is repeatedly scanned so long as switch 42 is held closed.

In a fourth and preferred mode of control, later herein described, the push button 42, preferably located on the control board 17, Fig. 1, is momentarily depressed to initiate a single scanning cycle, that is, one forward and reverse movement of the scanning unit or units clamped to tape 34. Thus, the system completes a measurement of one sample and is in readiness to begin the next analysis simply by again momentarily depressing the push button 42. The cycle ends, as hereinafter described, just before the limit switch 48 is closed, the motor 39 at that time operating in the reverse direction. Upon closure of push button 42, the motor 39 runs for a short time to effect closure of the limit switch 48, whereupon concurrently with energization of coil 49A of its reversing relay 49, there is completed a circuit through relay coil 51 whose contact 52 thereupon completes a circuit including the timer motor 53. Under control of a cam or equivalent driven by motor 53, the switch 54 is thereupon closed to complete a branch path in shunt with push button 42 which may then be released until it is desired to initiate the next cycle. The sequence of events described occurs rapidly so that as previously stated the push button 42 need be held closed only momentarily.

At least before limit switch 48 is reopened by its motor 39, the motor 53 through a cam or the like effects closure of its switch 55 to effect continuance of its energization when relay 51 is de-energized.

At the end of a predetermined time, somewhat less than that required for motor 39 to move a scanning unit 20 forward to one wavelength limit and all the way back to the other wavelength limit, the motor 53 of timer 50 through a cam or other mechanism opens the switch 55 to shut itself off and also opens switch 54 to break the branch circuit in shunt to the push button 42. This completes the one-scan control cycle. The signal lights shown by conventional symbol in Fig. 4 keep the operator informed of the stage of the analysis.

Figures 5, 5A, 8, 9:
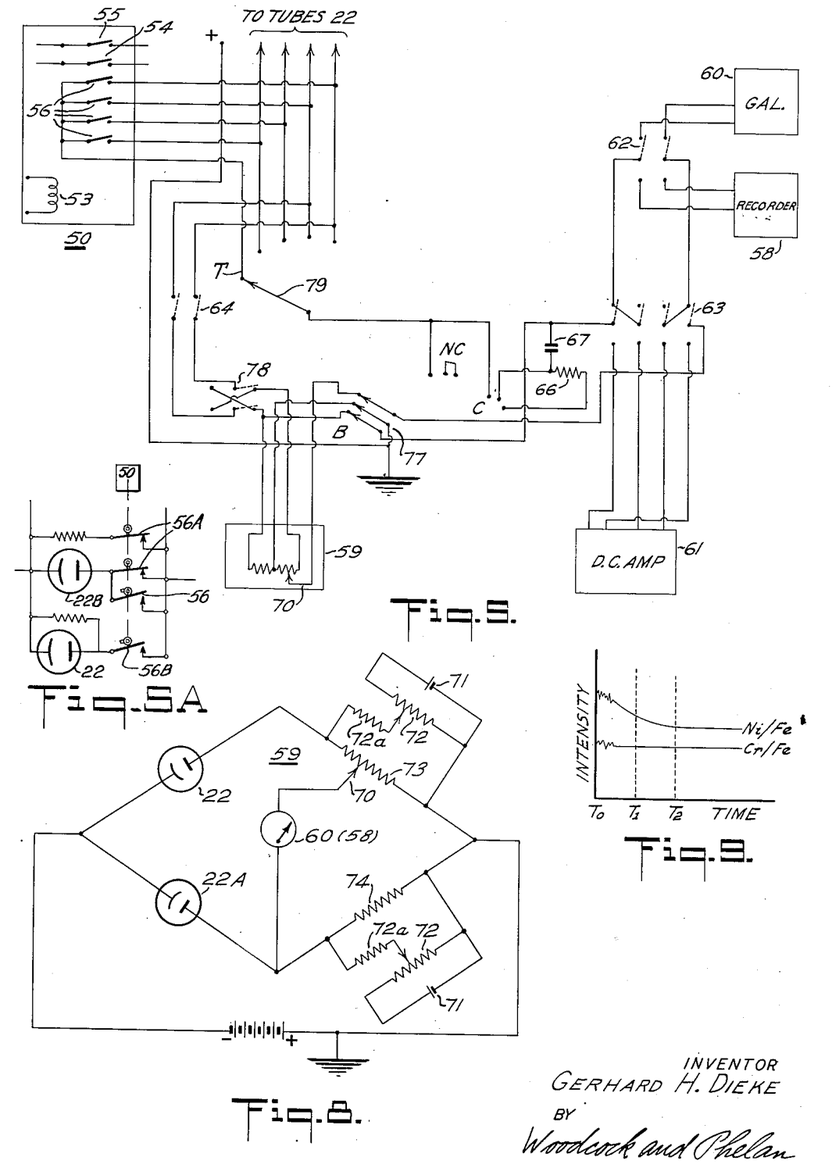
Fig. 5 schematically illustrates measuring and selector circuits utilized in the spectograph.
Fig. 5A illustrates selector switch connections to the measuring circuit.
Figs. 8, 8A and 8B illustrate a bridge circuit for measurement of the intensity ratio of spectrum lines.
Fig. 9 is an explanatory figure referred to in discussion of the shutter control.

The timer 50 may also be provided with a series of contacts 56, Fig. 5, for successively connecting a plurality of scanning tubes in circuit with the measuring apparatus as each unit in turn arrives at a portion of a spectrum it is to scan. The advantage of using a plurality of scanning tubes as compared with using a single tube to scan a plurality of widely spaced lines is that the scanning period or cycle for a complete analysis may be greatly reduced. The same timer and contacts 56 may be used with the fixed-unit arrangement to connect the several phototubes successively in circuit to measure the intensity of selected lines: for such use, the cycle of timer 50 is initiated by momentary depression of push button 57, which is in shunt to timer switch 55, at that time open. As described in connection with Fig. 4, shortly after motor 53 is energized it closes switch 55 and so insures continued energization after release of push button 57. During the cycle, the photomultiplier cells 22 are in desired sequence connected to and disconnected from the measuring circuit, the cycle ending when motor 53 shuts itself off by opening contact 55 in its supply circuit. However, for reasons above stated, the all-fixed unit arrangement is less desirable when the geometry of the spectrograph is affected by ambient conditions.

The measuring system, Fig. 5, provides for recording of the intensity of the individual spectrum lines by the recording microammeter 58, for recording of the relative intensity of a selected pair of lines using the ratio bridge 59, for indication of the intensity of individual lines by use of galvanometer 60, or for indication of the relative intensity of a selected pair of lines by use of the galvanometer and the ratio bridge 59. In any of the cases, increased sensitivity may be attained by inclusion of a direct-current amplifier 61 in circuit in advance of the ultimate measuring instrument 58 or 60. The recorder 58 may have an input impedance of 1000 ohms and a full sensitivity of 5 microamperes: by provision of shunts, full scale sensitivities of 5, 10, 20, 50, 100, 200 or 500 microamperes may be used. A suitable direct-current amplifier 61 has a gain of 10, 30, 80 and 400 with input resistances of .5, 1.5, 4 and 20 megohms, respectively. Using an amplifier gain of 100, one scale division of the galvanometer used corresponded with $5 \times 10^{-4}$ amperes.

As apparent from Figs. 5 and 12, the selection of either the recorder 58 or galvanometer 60 for measuring purposes is effected by the double-pole double-throw switch 62: the inclusion or exclusion of the amplifier 61 is determined by the position of the four-pole double-throw switch 63. For measurement of intensity ratios, the three-pole three-position switch 77 is thrown to the B position, and switch 64 closed to select the particular pair of photocells responsive to the lines whose intensity ratio is to be measured. The purpose of reversing switch 78 is described later in discussion of Fig. 8.

By changing the position of switch 77 from NC to C the time constant of the input circuit of the recorder or galvanometer can be increased to afford integration over a period longer than that provided by the inertia characteristic of the measuring instrument itself. With the switch in the C position, there is included in the input circuit of the selected measuring instrument a combination of resistance and capacity exemplified by resistor 66 and capacitor 67 of values chosen to afford integration over a desired brief interval; for example, two seconds more or less. As later mentioned herein, integration over a short interval, up to say 5 or 10 seconds, satisfactorily minimizes the effects of light-source variations providing a measurement can be made within the short time allowed in a scanning cycle.

All of the manually operable switches shown in Figs. 4 and 5 are preferably mounted at or adjacent the control board 17, Fig. 1.

The spectrograph installation described and particularly the control and measuring systems, Figs. 4, 5 and 12, are more complicated than necessary for many industrial uses of more specific routine nature.

The photomultiplier tubes may, for example, be of the 931A, 1P21 or 1P28 types, such as manufactured by the Radio Corporation of America. The radiation through the exit slit 21 strikes the photocathode and liberates electrons which are accelerated to the first dynode and there liberate several electrons; this multiplication continues as the electrons are accelerated to each successive dynode so that 200,000 to 300,000 electrons leave the last dynode, for collection by the anode, for each photoelectron. Fluctuations in the dynode voltages greatly influence the output current of the tube. For example, assuming an increase in the voltage difference between adjacent dynodes from 90 to 105 volts, the output current is more than trebeled. To insure an accuracy of measurement of 1%, the dynode voltages must be constant to within about .05 volt.

Figures 5, 7, 8A, 8B:
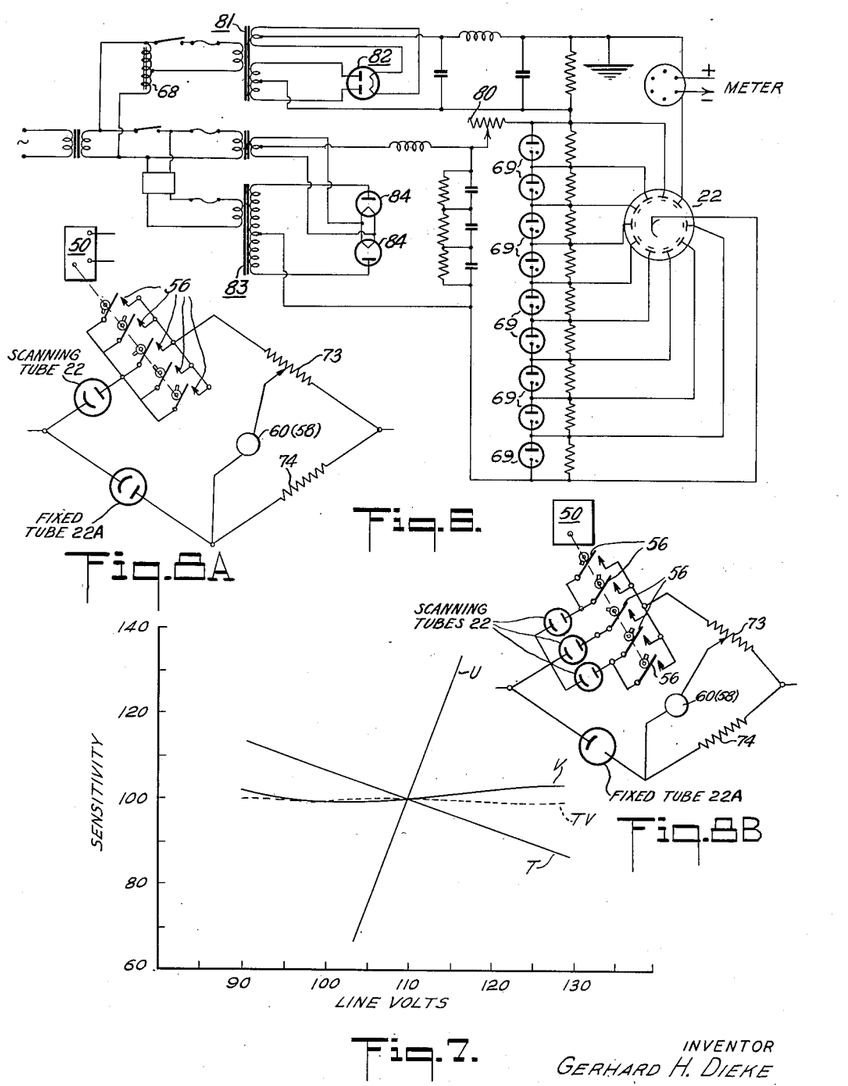
Fig. 7 is an explanatory figure referred to in discussion of Fig. 6.

Variation in the photocurrent is held to about 0.25% for line voltage fluctuations from 90 to 130 volts by the arrangement shown in Fig. 6, which uses a constant voltage transformer 68 and a series of voltage regulator tubes 69, one between each adjacent pair of dynodes. The regulator tubes 69 may be type VR90–30 with resistor 80 set at about 30,000 ohms or type VR105–30 with resistor 80 set at about 17,000 ohms. The high-voltage transformer, rectifier and filter systems are otherwise conventional: for example, transformer 81 is a step-up, center-tapped transformer for delivering about 650 volts to the anodes of rectifier tube 82 which may be type 5Z3: transformer 83 is a step-up, center-tapped transformer for delivering about 1000 volts to the anodes of rectifier tubes 84, 84 which may be type 866A/866. The effectiveness of the combination is graphically shown in Fig. 7, in which the output current is plotted as a function of the line voltage. Curve U shows the wide variation in output current without provision of any regulating device in the power pack. The poor regulation afforded by use of the transformer 68, without regulator tubes 69, is illustrated by curve T. The regulation afforded by tubes 69 above, exemplified by curve V, is still insufficient. The combined regulating effect of both the transformer 68 and tubes 69, exemplified by curve TV is more than sufficient to meet the severe requirement as to voltage stability essential to accuracy in use of photomultiplier tubes in spectrochemical analysis.

With the tubes above identified, the current should preferably be kept below about 100 microamperes to avoid fatigue: when high intensity lines are to be measured, excessive tube current may be avoided by use of diaphragms, filters, or by reduction in the dynode voltage.

When a number of different lines are to be measured successively, the light source should remain constant during the whole series of measurements. Few of the light sources used in spectrographic analyses, and none of them in routine industrial analyses, have such constancy. Short period fluctuations, such, for example, as the rapid fluctuations in an arc, are not of concern when the usual measuring devices are used because their period is short compared to the period of the movable system of the meter. For fluctuations of somewhat longer period, their effect may be compensated or averaged out by increasing the time constant of the input circuit of the meter, such as by use of the resistor-capacitor combination 66, 67 of Fig. 5. However, when the period of the fluctuation is of the order of 5 to 10 seconds or more, it is not feasible to further increase the period of the meter or the time constant of its input circuit in attempt to integrate the light source fluctuations.

With the bridge circuit 59, Fig. 8, the tubes 22, 22A simultaneously view or scan two selected lines so that neither rapid nor slow fluctuations in intensity of the light source affect the accuracy of the measurements of the relative intensity of the lines. In fact, the arrangement eliminates the effect of all fluctuations, whether due to the light source or other variables which similarly affect both tubes. Another, preferred arrangement is one in which one of the tubes is kept stationary on a reference line, while the other one is used for scanning.

In such preferred arrangement using one of units 20 continuously to view a selected reference line, the screw 8 of that unit is loosened or removed so that the unit is not moved by band 34 and may be clamped by any suitable means, represented by clamp 85, Fig. 12, at the proper point along the focal curve member 24.

If the current through tube 22, Fig. 8, is the larger, the slidewire contact 70 maybe adjusted so that no current flows to the measuring device 60 or 58, the fractional setting of the contact corresponding with the ratio of the two photocurrents. If the more intense line falls on tube 22A, the tube arms of the bridge are interchanged, as by a reversing switch 78, Fig. 5, to permit rebalancing of the bridge. With this bridge arrangement, it is essential that the "dark" current of the tubes be eliminated because only that part of the total current which is in excess of the dark current is proportional to the line intensity and the slidewire setting is indicative of true intensity ratio only if the voltage drops across the arms of the bridge are produced by the excess current.

In the circuit shown in Fig. 8, this is done by effecting flow of current, as from battery 71 through a slidewire 72 and tapping off therefrom through a resistor 72a such voltage that the dark current is compensated. Two such networks are necessary; one in shunt to the bridge slidewire 73, and the other in shunt to resistor 74 in an adjacent arm of the bridge 59, but the battery 71 may be common to both.

For a short time after the light source of a spectrograph is excited, the line intensities are unstable as indicated in Fig. 9 and it is, therefore, desirable that the openings of the shutter 16 be delayed until lapse of a time interval, as for example $T_0$–$T_1$, to avoid measurements which are useless and misleading. This delay may be effected by inclusion in the timer 50, Fig. 4, of another set of contacts 75 and 76 controlled by cams or the like which effect energization of the light source and the shutter-opening device in proper sequence and with suitable lapse of time. Moreover, the rate at which the relative intensities of different pairs of lines approach a stable value after initiation of the light discharge is different for different elements as indicated by the two curves of Fig. 9. Consequently, the order in which the time contacts 56 are selected to close to connect the tubes 22 in circuit should be chosen first to connect for measurement of the lines which most rapidly attain a stable intensity. By way of example, the measurement of the chrome line in chrome-nickel-iron sample may be taken early in the measuring cycle, as at T, or later, whereas the measurement of the nickel line in the sample should be taken later in the cycle as at $T_2$ or later.

When in one control cycle of scanning motor 39 there is direct measurement of the intensity of several lines relative to a reference, the fixed reference tube 22A and the scanning tube 22, as in Fig. 8, are connected in adjacent arms of the bridge during the measurement. Specifically, as the scanning unit is moved by motor 39 through successive spectrum regions including the lines to be scanned, the corresponding selector switch 56 (Fig. 8A) is actuated by timer 50 temporarily to include the scanning tube in the bridge circuit. When more than one scanning unit is used for direct measurement of the relative intensity of different selected pairs of spectrum lines, the scanning units are moved in unison by the scanning motor with fixed spacing between them corresponding with the spacing in the spectrum of the lines to be scanned and the phototubes of the scanning units are selectively included in the bridge circuit by the timer-actuated switches 56 (Fig. 8B) during scanning of the corresponding spectrum lines. Thus, in both cases there is direct measurement of the relative intensity of different selected pairs of spectrum lines, the reference line of each pair being the one viewed by the fixed unit 22. Since, as above stated, the slit may be wider in phototube analysis than in photographic analysis, the split of the reference unit may be sufficiently wide for continued viewing of the reference line despite effect of ambient temperature upon the geometry of the spectrograph. For measurement of the relative intensity of different pairs of spectrum lines with no common reference, each pair of lines may be scanned by a corresponding pair of scanning units movable in unison with belt 34 and spaced in accordance with the spectrum spacing of the lines and the pairs of scanning phototubes are successively connected in the bridge circuit by the selector switches as each pair in turn moves through a selected pair of spectrum lines.

For use of the spectrograph in the first order, there is no difficulty in obtaining suitable filters. For wavelengths below 3000 angstroms, the 1P28 tube, which has an envelope of special glass suited for transmission of ultraviolet radiation, is suitable. For wavelengths between 3000 and 4000 angstroms, either the 1P28 or the 931A tube is suitable. For wavelengths longer than 4000 angstroms, the 931A or the 1P21 should be used to avoid overlapping with the second order of the ultraviolet radiation.

Figure 10:
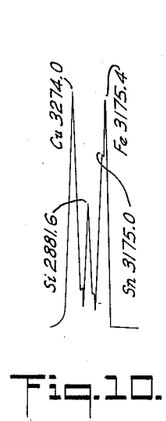
Figs. 10 and 11 are curves referred to in discussion of a typical analysis.

As indicative of a typical analysis performed with the spectrograph, reference is made to Fig. 10 which is a reproduction of the automatically recorded concentration of the constituents of a steel including silicon, copper and tin. The four lines used were Cu 3274.0, Si 2881.6, Sn 3175.0 and Fe 3175.4 The iron line serves as the internal standard. As the iron and tin lines are very close together, they were scanned by the same tube, whereas the spacing between the other two lines is relatively great so that they were scanned by separate tubes. The three tube units 20 were so spaced on the band 34 that the 3175.0 and 3175.4 pair was scanned first: about five seconds later the second tube unit scanned the 2881.6 tin line and after about another five seconds the 3274.0 copper line was scanned. The timer 50, Figs. 4 and 5, was so set that each tube was connected, as it scanned its line, to the recorder 58 which was switched to the next tube as soon as the slit was passed. When the last line was recorded, the control system, Fig. 4, shut off the system with the scanning units back at their original position. During the return of the scanning units, the operator had time to insert a new sample for the next analysis which was initiated merely by again pressing the starting button 42.

Figure 11:
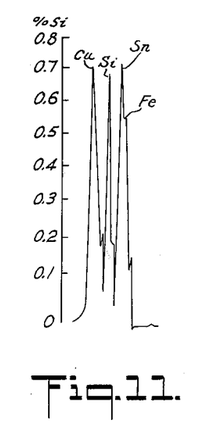

A working curve of silicon was obtained and used to calibrate a concentration scale, Fig. 11, from which the silicon concentration may be read directly: similar scales may be obtained for the other constituents so that by mounting the scales on the recorder or indicator the per cent concentration of the constituents may be read as soon as the corresponding line appears. As indicative of the sensitivity of the system, it is pointed out that the sample analyzed, Fig. 11, had only about 0.025% Sn. When the concentration of a particular element is low, higher sensitivity for that particular line may be attained by using a higher sensitivity for the recorder and connecting a shunt in circuit with each of the tubes which scan the other lines from the anode leads to ground. As shown in Fig. 5A, the tube 22B for scanning the weak line may be connected, without a shunt, to the recorder by a selector switch 56 of timer 50 and another tube 22 for at a different time scanning a strong line is connected, with a shunt, to the recorder by another selector switch 56B of timer 50. When as in the specific example above, a tube such as 22B scans both a strong line (Fe) and a weak line (Sn), it is shunted for the strong line (Fig. 5A), when timer switches 56A are closed, and not shunted for the weak line.

The speed at which an analysis may be made depends upon the response time of the recorder and the number of lines to be scanned. About five seconds for each line is ample so that for the sample above discussed the analysis was complete in less than half a minute after insertion of a sample in the holder and each concentration could be at once read as its line was scanned. To obtain a similar record by use of the photographic method and a densitometer would take many times that long. With the multiplier tube recording, any significant fault with the light source is at once apparent from the record being traced and the trouble may be corrected or the questionable results immediately checked. In the foregoing typical analysis, the iron reference line and the tin line are very close together precluding use of the bridge network, Fig. 8, for cancellation of source fluctuations. When the line spacing permits, the preferred arrangement, previously described, having a fixed reference unit and at least one scanning unit, is the more desirable. With photographic operation, the results are not available until the plate has been processed and passed through the densitometer which may be hours after the sample was initially placed in the light source.

The sensitivity of the photomultiplier system is such that within a few seconds there can be determined the intensity of weak lines which produce a tube current as small as 0.01 microampere: to obtain the same measurement photographically would require several hours. Furthermore, the linearity of the photomultiplier response makes it possible readily to measure the intensity ratio of lines of widely different intensity. For example, intensity ratios of the order of 40,000 to 1 may be made with practically the same ease as ratio of lines of comparable intensities; whereas, the useful density ratios of a photographic plate are low, about 0.3 to 1.7. Moreover, because of the linearity of the tube sensitivity, intensity measurements of line pairs which are close together and measured by the same tube can be made without any calibration.

What is claimed is:

1. A system for rapid direct measurement of the relative intensity of selected lines of a spectrum produced by a spectrograph including a spectrographic light source and associated diffraction means, comprising one fixed unit and several scanning units, each including a photomultiplier tube and associated slit structure for selective admission to said tube of a narrow wavelength band of the spectrum, means for effecting movement of said scanning units in unison along the focal curve of the spectrum at regions respectively including said selected lines, while the fixed unit remains stationary in a position where it is exposed to a reference line, a bridge circuit including the fixed tube in one and one scanning tube in the other arm thereof to produce an unbalance corresponding with the ratio of the output currents of this pair of tubes, means to switch successively the various scanning tubes into the circuit as each in turn passes through a narrow spectral region including a selected line, and means responsive to unbalance of said bridge circuit for measuring the intensities of lines successively viewed by the scanning units with respect to the intensity of the line viewed by said fixed unit.

2. A system for spectrochemical analysis by direct measurement of the intensity of lines of a spectrum produced by a spectrograph including a sepctrographic light source and associated diffraction means, comprising at least two scanning units each comprising a photomultiplier tube and an associated slit structure, a member shaped to correspond with the focal curve of said spectrum, motor means coupled to said units and energizable to move them in unison at constant predetermined speed and in fixed spaced relation along said focal curve member, measuring apparatus including current-responsive means, and timing means operative during energization of said motor means and including selector switches sequentially actuated temporarily individually to connect said tubes to said current-responsive means for continuous response thereof as each unit moves along a particular part of said focal curve member to scan the corresponding region of said spectrum.

3. A system for spectrochemical analysis by direct measurement of the intensity of lines of a spectrum produced by a spectrograph including a sepctrographic light source and associated diffraction means, comprising at least two scanning units each comprising a photomultiplier tube and an associated slit structure, a member shaped to correspond with the focal curve of said spectrum, reversible driving means including a motor coupled to said units to move them in unison at constant predetermined speed and in fixed spaced relation along said focal curve member, control means controlling said reversible driving means to effect forward and reverse scanning movements of said units along a selected portion of said focal curve member, measuring apparatus including current-responsive means, selector switches for respectively connecting the tubes of said scanning units to said current-responsive means and structure operating in timed relation to said motor and said scanning units and driven thereby for actuating said selector switches selectively to connect at least one of said tubes to said current-responsive means during aforesaid movement of said units in forward direction and selectively to connect at least another of said tubes to said current-responsive means during aforesaid movement of said units in reverse direction.

4. A spectrographic system for measurement of the intensities of selected lines of a spectrum produced by a spectrograph including a spectrographic light source and associated diffraction means, comprising a guide member shaped to correspond with the focal curve of the spectrum, a belt movable in a path adjacent said guide member, two or more scanning units each including a phototube and slit structure, means for releasably clamping said units to said belt in selected fixed spaced relation, a motor for driving said belt to effect movement of said units along said focal curve member, means for effecting reversal of said motor including limit switches operated by said motor, measuring apparatus including current-responsive means, and a time switch for selectively connecting the phototubes of said units to said current-responsive means each as its unit moves along said focal curve member through the position of one of said spectrum lines.

5. A system for spectrochemical analysis by direct measurement of selected lines of a spectrum produced by a spectrograph having spectrum-producing means, comprising two or more scanning units each comprising a phototube and an associated slit, driving means for effecting concurrent movement of said units in fixed spaced relation along the focal curve of the spectrum, said units in predetermined sequence respectively scanning said selected lines, current-responsive means, selector switches controlling connection of said tubes to said current-responsive means, and actuating means for said selector switches operated in timed relation to said driving means of said scanning units selectively to connect said units to said current-responsive means as each in turn scans a selected line.

6. A system for spectrochemical analysis by direct-recording of the intensity of selected lines of a spectrum produced by a spectrograph having spectrum-producing means, comprising at least two units each including a phototube and a line-isolating slit, means including a reversible motor for moving the units in unison along the focal curve of the spectrum in fixed spaced relation, limit switches controlling reversal of said motor upon arrival of said units at predetermined regions of the spectrum, a recorder, selector switches controlling connection of said tubes to said recorder, actuating means for said selector switches operated in timed relation to said driving means of said units selectively temporarily to connect said units to said recorder as each in turn scans a corresponding line of the spectrum, and a control system including said motor, said limit switches and said selector switches for effecting at least one recording cycle during which each unit is moved forward and back by said reversible motor within spectrum limits determined by said limit switches and its tube is temporarily connected by one of said selector switches to said recorder for a predetermined scanning interval.

7. A system for direct-recording of the intensity of selected lines of a spectrum produced by a spectrograph having spectrum-producing means, comprising at least two units each including a phototube and a line-isolating slit, means including a reversible motor for moving the units in unison along the focal curve of the spectrum in fixed spaced relation, limit switches controlling reversal of said motor upon arrival of said units at predetermined regions of the spectrum, a recorder, selector switches controlling selective connection of said tubes to said recorder, timing means actuating said selector switches in predetermined time relations corresponding with line-scanning positions of said units as moved by said motor, a control system including said motor, said limit switches and said timing means in whose control cycle said motor moves said units forward and back within spectrum limits fixed by said limit switches and said tubes are temporarily connected to said recorder by said selector switches as each unit scans a selected spectrum line, and a switch momentarily actuated to initiate a cycle of said control system.

8. In a spectrograph including a spectrum-producing means, a member shaped to correspond with the focal curve of the spectrum, one or more scanning units each comprising a phototube and slit structure for isolating a spectrum line, a belt movable in a path defined by the shape of said member, and means for attaching each of said scanning units to said belt, whereby movement of said belt moves each unit for selective passage through its slit to its phototube of radiation of progressively different wavelength.

9. An arrangement as in claim 8 in which a motor drives the belt at predetermined speed and in which selector switches operated in timed relation to the motor temporarily connect each unit to a recorder as the unit is moved by the belt through a region of the focal curve which includes a preselected line.

10. A system for spectrographic analysis of a spectrum produced by a spectrograph having a light source and associated diffraction means, comprising a scanning unit and a stationary reference unit each comprising a phototube and associated slit structure for admitting radiation from said source to the phototube, a balanceable network including said phototubes for measuring the ratio of the intensities of the radiation received by said tubes, motor means for effecting movement of said scanning unit relative to the spectrum, an electrical control system for effecting a scanning cycle of operation of said motor during which said scanning unit at predetermined times in the cycle sequentially scans selected lines thereof, and a recorder in circuit with said network for recording said ratios.

11. A system as in claim 10 additionally including a timer having a motor energized in the scanning cycle and including selector switches for shunting the tube of the scanning unit in accommodation of spectrum lines of substantially different intensity.

12. A system for spectrochemical analyis by direct measurement of selected lines of a spectrum produced by a spectrograph having diffraction means associated therewith, comprising two or more units each including a phototube and an associated slit, structure for positioning said units for passage by the respective slits of selected lines of the spectrum, measuring apparatus, selector switches for connecting the phototubes of said units to said measuring apparatus, and a timer operative in a cycle of its operation sequentially to actuate said selector switches successively individually to connect said phototubes to said measuring apparatus.

13. A system for spectrographic analysis of a spectrum produced by a spectrograph having a light source and associated diffraction means, comprising a scanning unit for exposure to lines of substantially different intensities and a stationary reference unit each comprising a phototube and associated slit structure for admitting radiation from said source to the phototube, a balanceable network including said phototubes for measuring the ratio of the intensities of the radiation received by said tubes, motor means for effecting movement of said scanning unit relative to the spectrum, an electrical control system for effecting a scanning cycle of operation of said motor during which said scanning unit at predetermined times in the cycle sequentially scans selected lines thereof and including switching means actuated during said cycle to change the effective sensitivity of said scanning unit in accommodation of said spectral lines of substantially different intensities, and a recorder in circuit with said network for recording said ratios.

14. A system for automatic, rapid and direct measurement of the relative intensity of lines of a spectrum produced by a spectrograph and associated diffraction means, comprising one fixed unit and one scanning unit, each including a photomultiplier tube and associated slit structure for selective admission to the tube of a wavelength band of the spectrum, motor means operative in a cycle of operation to effect relative movement of said scanning unit along the spectrum for exposure to lines of substantially different intensities while the fixed unit remains exposed to a reference line, a bridge circuit including the tubes of said units in different arms thereof to produce an unbalance corresponding with the ratio of the tube currents, means responsive to unbalance of the bridge for measuring the intensities of lines successively viewed in the cycle of said motor means by the scanning unit with respect to the intensity of the line viewed by said fixed unit, and switching means automatically operated at predetermined time in the cycle of the motor means to change the sensitivity of the scanning unit in accommodation of scanned spectral lines of substantially different intensities.

15. Apparatus for automatic spectrochemical analysis of preselected lines of a spectrum having substantially different intensities, comprising a scanning unit comprising a phototube and associated slit structure, motor means for effecting movement of said scanning unit relative to the spectrum, an electrical control system for effecting a scanning cycle of operation of said motor during which said scanning unit at predetermined times in the cycle sequentially scans selected lines thereof, and switching means automatically actuated during a cycle of operation of said motor to vary the effective sensitivity of said unit for different positions thereof relative to said spectrum in accommodation of spectral lines of substantially different intensities.

GERHARD H. DIEKE.

REFERENCES CITED

The following references are of record in the file of this patent:

UNITED STATES PATENTS

| Number | Name | Date |
| --- | --- | --- |
| 1,716,775 | Hayes | June 11, 1929 |
| 1,806,198 | Hardy | May 19, 1931 |
| 1,971,317 | Sheldon et al. | Aug. 21, 1934 |
| 2,254,721 | Aldous et al. | Sept. 2, 1941 |
| 2,279,646 | Smith | Apr. 14, 1942 |
| 2,344,645 | Schwarz | Mar. 21, 1944 |
| 2,420,077 | Hasler et al. | May 6, 1947 |
| 2,436,104 | Fisher et al. | Feb. 17, 1948 |
| 2,446,874 | Geffner et al. | Aug. 10, 1948 |

FOREIGN PATENTS

| Number | Country | Date |
| --- | --- | --- |
| 274,826 | Great Britain | 1928 |
| 493,861 | Great Britain | Oct. 17, 1938 |

OTHER REFERENCES

Journal of the Optical Society of America for January 1942, pages 8 to 24 inclusive.

Journal of the Optical Society of America, vol. 32, published 1942, pages 390 to 396 inclusive.

Journal of the Optical Society of America, vol. 34, published 1944, pages 6 to 11 inclusive.

Journal of the Optical Society of America, vol. 35, published 1945, pages 471 to 480 and 646 to 650, both inclusive.